US010582723B2

(12) United States Patent
Cox et al.

(10) Patent No.: US 10,582,723 B2
(45) Date of Patent: Mar. 10, 2020

(54) YEAST CELL WALL ENRICHED IN MANNAN OLIGOSACCHARIDE PROTEIN

(71) Applicant: BIOTHERA, INC., Eagan, MN (US)

(72) Inventors: Donald J. Cox, Maple Grove, MN (US); Michael Danielson, St. Paul, MN (US); Kyle S. Michel, Mendota Heights, MN (US)

(73) Assignee: Biothera Pharmaceuticals, Inc., Roseville, MN (US)

( * ) Notice: Subject to any disclaimer, the term of this patent is extended or adjusted under 35 U.S.C. 154(b) by 0 days.

(21) Appl. No.: 15/304,167

(22) PCT Filed: Apr. 14, 2015

(86) PCT No.: PCT/US2015/025766
§ 371 (c)(1),
(2) Date: Oct. 14, 2016

(87) PCT Pub. No.: WO2015/160818
PCT Pub. Date: Oct. 22, 2015

(65) Prior Publication Data
US 2017/0027210 A1 Feb. 2, 2017

Related U.S. Application Data

(60) Provisional application No. 61/979,305, filed on Apr. 14, 2014.

(51) Int. Cl.
*A23L 33/145* (2016.01)
*A23K 20/163* (2016.01)
*A23L 33/10* (2016.01)
*A23K 10/16* (2016.01)
*A23K 10/38* (2016.01)

(52) U.S. Cl.
CPC ............ *A23L 33/145* (2016.08); *A23K 10/16* (2016.05); *A23K 10/38* (2016.05); *A23K 20/163* (2016.05); *A23L 33/10* (2016.08); *A23V 2002/00* (2013.01)

(58) Field of Classification Search
CPC ...... A23K 20/163; A23K 10/16; A23K 10/38; A23L 33/145; A23L 33/10
See application file for complete search history.

(56) References Cited

U.S. PATENT DOCUMENTS

| 4,992,540 | A * | 2/1991 | Jamas | C08B 37/0024 435/101 |
| 5,028,703 | A * | 7/1991 | Jamas | C08B 37/0024 435/101 |
| 6,444,448 | B1 * | 9/2002 | Wheatcroft | C12P 19/04 424/234.1 |
| 8,063,026 | B2 * | 11/2011 | Katz | A61K 31/715 424/771 |
| 2005/0020490 | A1 | 1/2005 | Courie, Jr. et al. | |
| 2007/0299034 | A1 * | 12/2007 | Versali | A61K 31/722 514/55 |
| 2010/0190872 | A1 * | 7/2010 | Sedmak | A61K 8/73 514/777 |

FOREIGN PATENT DOCUMENTS

WO WO-9504467 A1 * 2/1995 ............ A23K 10/12

OTHER PUBLICATIONS

MMachine translation of BG1325U1 dated Jun. 2010.*
Dawson Proc. Aust. Poult. Sci. Sym., pp. 100-105. (Year: 2001).*
"Yeast Cell Wall—Yeast extract", downloaded from www.yeastextract.info/public/documents/yeastproducts/yeast_cell_wall.pdf. 1 page, dated 12/ (Year: 2004).*
Hooge, Danny M., "Meta-Analysis of Broiler Chicken Pen Trials Evaluating Dietary Mannan Oligosaccharide", International Journal of Poultry Science, vol. 3, No. 3, 2004, pp. 163-174.
Lipke et al., "Cell Wall Architecture in Yeast: New Structure and New Challenges", Journal of Bacteriology, vol. 180, No. 15, Aug. 1998, pp. 3735-3740.
Rosen, G.D., "Holo-Analysis of the Efficacy of Bio-Mos in Turkey Nutrition", British Poultry Science, vol. 48, No. 1, Feb. 2007, pp. 27-32 (Abstract only—2 pages).
Torrecillas et al., "Immune Stimulation and Improved Infection Resistance in European Sea Bass (*Dicentrarchus labrax*) Fed Mannan Oligosaccharides", Fish & Shellfish Immunology, vol. 23, 2007, pp. 969-981.
Van Der Vaart et al., "Identification of Three Mannoproteins in the Cell Wall of *Saccharomyces cerevisiae*", Journal of Bacteriology, vol. 177, No. 11, Jun. 1995, pp. 3104-3110.

* cited by examiner

*Primary Examiner* — C. Sayala
(74) *Attorney, Agent, or Firm* — Biothera, Inc.

(57) ABSTRACT

The present invention relates to yeast cell wall 5 compositions enriched with mannose, mannose extracts and processes for making the same.

13 Claims, 1 Drawing Sheet

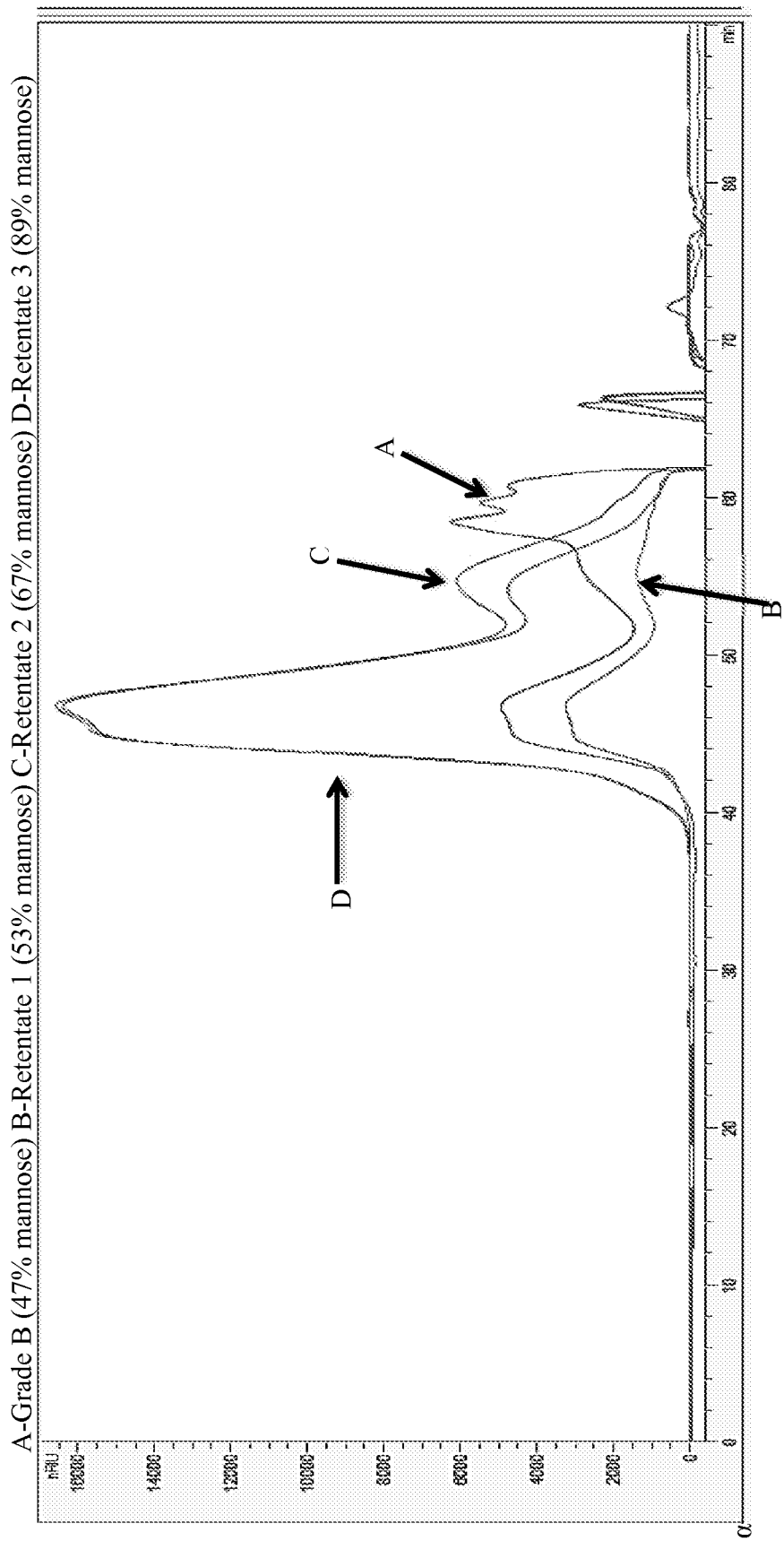

YEAST CELL WALL ENRICHED IN MANNAN OLIGOSACCHARIDE PROTEIN

CROSS-REFERENCE TO RELATED APPLICATION

This application claims priority to U.S. Provisional Patent Application Ser. No. 61/979,305, filed Apr. 14, 2014, which is incorporated herein by reference.

BACKGROUND

The present invention relates to production of enriched yeast cell wall compositions. Yeast wall mannoproteins are highly glycosylated polypeptides, often 50 to 95% carbohydrate by weight, and thus may be thought of as yeast proteoglycans. The mannoproteins are currently used in a range of animal feed diets for their protective effects on the gastrointestinal tract.

Mannan-oligosaccharide based nutritional supplements, MOS, are widely used in nutrition as a natural additive. MOS has been shown to improve gastrointestinal health as well Is overall health, thus improving well-being, energy levels and performance, in the animal production industry, for example, MOS is widely used in poultry, calves, pigs and aquaculture diets. Research studies have supported the efficacy in each of these production categories.

The existing MOS products on the market are simple cell wall products with little differentiation. Cell wall product with higher levels of MOS can provide a performance advantage over competitors by increasing the active component in the yeast cell wall material.

SUMMARY OF THE INVENTION

The present invention is a mannan-oligosaccharide extract, mannan-enriched yeast cell wall, a process for making the compositions and their use in animal feed additives.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

FIG. 1 shows GPC traces of mannan-enriched yeast cell wall material.

DETAILED DESCRIPTION OF ILLUSTRATIVE EMBODIMENTS

During the production of yeast β-glucan, the initial step is a water wash step involving alkali (NaOH) that liberates large quantities of mannoprotein. Currently that proteinaceous material is considered waste and is treated as an environmental waste that must undergo wastewater treatment (a significant expense). The invention involves collecting the current alkali wash water that is high in MOS, neutralizing the proteinaceous water, spraying it onto yeast cell wall material and drying the resulting mixture. The resulting product will be 25-50% higher in MOS content. The invention also involves spray-drying the MOS extract to create a concentrated MOS product.

The existing MOS products on the market basically consist of yeast cell wall with little to no differentiation or purification, and the MOS residing in the cell wall is in an insoluble form. Higher levels of MOS in a cell wall product or a concentrated MOS extract would provide a performance advantage over other MOS products by increasing the active component. In addition, the added MOS component of the present invention is solubilized, which provides significant advantages over insoluble MOS.

MOS can reduce the number of pathogenic bacteria in an animal's gastrointestinal tract. Pathogens possess small hair-like projections known as pili or fimbriae on their surfaces, which are rich in lectins. Lectins are necessary for the pathogen's ability to bind to epithelial cells of the gut. Pathogens with pili that are specific for mannose attach to mannose-containing cells in the gastrointestinal tract. Once the pathogens attach, they are able colonize the gastrointestinal tract and cause disease. If, however, an animal is orally administered MOS, for example in its feed, the pathogens will bind to the MOS in the digestive tract, which prevents the pathogens from binding to the intestinal epithelia (or mucosa) and establishing itself in the gastrointestinal tract. The MOS "rafts" or carries the pathogens out of the gastrointestinal tract and it is excreted in the fecal waste. Soluble MOS is superior to insoluble MOS product, because soluble MOS covers a greater volume and area of the gastrointestinal tract allowing it to contact, interact and bind to more undesirable pathogenic bacteria.

There is also a cost benefit to using soluble MOS over insoluble MOS. The current inclusion rate of yeast cell wall is about 1-4 kg/metric ton in the finished feed, but this is reduced by 20-50% with soluble MOS which also allows more nutrients to be included in the finished feed (Protein, carbohydrate, fat, essential nutrients).

Briefly, the process involved washing yeast cell wall to remove soluble unwanted material from the supernatant, extracting the cell wall with base, separating the extracted mannan from the remaining insoluble cell wall, quenching the base used in the extraction and spray-drying. Alternatively, the quenched extracted mannan solution can be combined with additional un-extracted cell wall and then spray-dryed. The latter product contains both soluble and insoluble MOS.

The soluble MOS product taught herein uses alkali and acid hydrolysis steps to liberate protein, mannans and other carbohydrates. Previous processes have used enzymes to release similar materials. However, the enzyme process will release proteins and carbohydrates with very different properties than those from alkali hydrolysis. Alkali hydrolysis is less damaging to protein and carbohydrate structure than enzymes, which rapidly digest proteins and complex carbohydrates. Alkali and acid hydrolysis leaves proteins and carbohydrates closer to their native structure with minimal alkali or acid-catalyze hydrolysis. Further, the enzyme process will digest other valuable yeast-derived products such as β-glucan. Alkali and acid hydrolysis, however, leaves ii-glucan and other cell wall components intact and in native form such that these components can be commercialized.

EXAMPLE 1

Cell Wall Wash Procedure

A small sample of yeast cell wall was washed by repeating three times a process of centrifugation, discarding of the supernatant, dilution with DI water, and vortexing. The washed cell wall was found to contain 23% mannose, the corresponding soluble solid from the supernatant contained only 3% mannose. Based on the low level of mannose in the soluble solids in the supernatant we decided to wash the cell wall prior to extraction of the mannan.

The entire 76 L of cell wall was washed in batch mode by adding 500 mL of creams to 750 mL centrifuge bottles and spinning for 30 minutes at 3,250 RPM in a centrifuge equipped. with a 13 cm swinging bucket rotor, Following centrifugation, the supernatant was discarded and approximately 300 ml. of DI water was added to each bottle. The pellet was stirred with a spatula in order to obtain a homogeneous suspension that was then centrifuged as described above. This was repeated a second time at which point the pellet was brought up in a minimum amount of water and transferred to 5 gallon pails. After washing all 76 L of cell wall, the material was split evenly into four 5 gallon pails resulting in a volume of 4.5 gallons (17 L) per pail. To prevent contamination, the pH of the solution was raised to a pH between 9 and 10 with NaOH (50% aqueous solution, 19.4 M). The volume of 50% NaOH that was added was recorded.

Mannan Extraction

The mannan extraction was performed by placing the bucket in a 50° C. water bath that. consisted of a large plastic tub filled with water that was being circulated through a temperature controlled circulating water bath. Once the internal temperature of the solution in the bucket reached 50° C., the concentration of base was brought to 0.5 M by adding a total of 438 mL of 50% NaOH (the volume added to get the initial pH to 9-10 was part of the 438 mL volume that was added to each). After adding base, the pH readings of the solutions in the four buckets were between 12.75 and 12.84. The buckets were stirred with a large plastic spoon every 10 min over a total reaction time of 1 h. Following the reaction, the buckets were stored at 4° C. prior to the steps described below.

The extracted solution was centrifuged as described above with the exception that the supernatant was the desired fraction and was saved. The supernatant from each bottle was pooled by pouring into a clean bucket. Each pellet was then washed once with ca. 300 mL of water by stirring with a spatula and centrifuging a second time. The supernatant was pooled into the same bucket as the material from the first centrifugation. The pellets were discarded diet this wash step. The pooled supernatants were also stored at 4° C.

Base Quenching Procedure

The base in the extracted solution was quenched using a strongly acidic anion exchange resin (ABA Water Sources, Plainview, Minn.). The quench was performed in this manner versus using HCl to avoid the production of NaCl, which would have ended up in the final product after spray drying. The quenching procedure was performed by adding 2.4 kg of acidic resin to 13.2 L batches of the extracted material in 5 gallon pails. The solution was stirred approximately every 20 min. The pH of the solution gradually dropped and after about 1 h the pH was between 4 and 4.5. At this point stirring was stopped and the suspension was allowed to settle for at least 1 h. The solution settled into three layers. The top layer was a light yellow dear solution, the middle layer was a tan suspension, and the bottom layer was a suspension containing mostly resin. The top yellow supernatant was removed with a beaker and passed through two pre-wetted very course coffee filters placed on top of one another in a 9 cm wide porcelain Buchner funnel, The filters were replaced very frequently due to clogging. After the bulk of the clear supernatant was removed and filtered, the middle layer containing the suspension was centrifuged as described above and the supernatant was poured through the same Buchner funnel as described above. The third layer containing the resin was rinsed several times with DI water in the bucket and decanted into centrifuge bottles. This solution was centrifuged and filtered as described above. All of the filtered solution was combined into clean 5 gallon buckets. Approximately 22 gallons (83 L) of the filtered solution was obtained, The solution contained approximately 2.5% (25 g/L) solids and the Dionex based mannose assay provided values of approximately 9 mg/mL mannose concentration in each bucket corresponding to roughly 35% pure mannose containing extract.

Mixing and Spray Drying

A new batch of yeast cell wall was obtained for spray drying with the extracted mannan from above. The new cell wall was found to contain 15% (150 g/L) total solids and the concentration of soluble solids in the supernatent was 3.3% (3.3 g/L). It was eventually determined, after spray drying, that the soluble solids in the supernatent contained 9 mg/mL of mannose, which translates to 27% mannose containing material. The washed cell wall was eventually found to contain 17% mannose.

The new batch of cell wall was centrifuged as above by spinning 700 mL in 750 mL centrifuge bottles. The supernatant was then discarded and the pellet was brought up in approximately 300 mL of the extracted mannan solution and poured into a clean bucket. The bottle was then rinsed twice with additional extracted mannan solution. Approximately 16.8 L of cell wall was processed in this manner. Another 5.6 L of cell wall was spun down and brought up in a minimal volume of DI water. All of the washed cell wall and extracted mannan were then stored at 4° C. overnight. The next day at the University of MN food lab the 83 L of extracted mannan and the 3.8 kg of washed cell wall were combined in a stainless steel steam jacketed tank with an electric paddle mixer. The pH of the final mixed solution was 4.8 and the final % solids were 8% (8 g/L) with an approximate volume of 28 gallons (106 L). The solution was pasteurized by raising the temperature to 160° C. with the steam jacket. When the temperature reached 160° C. the steam was shut off and the solution was allowed to slowly cool while spray drying. The material was spray dried using an inlet temperature of approximately 110° C., an outlet temperature of 90° C., and a feed rate of 200 mL/min. The spray dryer was run for approximately 8 hours to furnish 5.2 kg of final powder.

Analysis of the Final Powder

A sample of the mannan-enriched cell wall product was tested for mannose and glucose content and was found to contain 23% mannose and 16% glucose. The powder was found to contain 39% protein as determined by combustion analysis where the % N is multiplied by 6.25. The total amount of MOS (mannoprotein, mannan) is determined by adding the mannose content and protein content. The mannan-enriched cell wall and extracted mannan products contain 62% and 72% mannan, respectively. Table 1 shows these results as well as those for the cell wall onto which the extracted mannan was spray dried and the cell wall from which the mannan was extracted. Also shown in Table 1 are three commercial products from AllTech, Sensient, and Citadel. The 2 kg of extracted mannan product was also tested for mannose, glucose, and protein content.

The starting material was approximately 20 gallons (76 L) of bulk creams. The tan slurry was found to contain 16% (160 g/L) of total dissolved solids and when centrifuged the supernatant contained 1.9% (19 g/L) dissolved solids. Subtraction of the concentration of the supernatant from the overall concentration gave 14.1% (14.1 g/L) dissolved solids The amount of mannose, expressed as a percentage of total mass, was calculated for samples via the use of a monosaccharide assay based on trifluoroacetic acid hydrolysis followed by separation and quantification on a Dionex using high performance anion exchange chromatography with pulsed amperometric detection (HPAEC/PAD) using an internal inositol standard and comparing the areas obtained from samples to that of glucose and mannose standard curves.

TABLE 1

Analytical results for final material, intermediates, and competitor samples.

| Sample | Mannose (%) | Glucose (%) | Nitrogen (%) | Protein (%)[1] | Total MOS (%) |
|---|---|---|---|---|---|
| Ex. 1 Mannan Enriched Cell Wall | 23 | 16 | 6.25 | 39 | 62 |
| AllTech | 9 | 20 | 4.88 | 31 | 40 |
| Sensient | 12 | 51 | 4.05 | 25 | 37 |
| Citadel | 20 | 28 | 3.17 | 20 | 40 |
| Cell Wall A (washed)[2] | 23 | 30 | — | — | — |
| Cell Wall B[3] | 17 | 28 | 6.56 | 41 | 58 |
| Cell Wall B (washed)[3] | 17 | 24 | 6.55 | 41 | 58 |
| Mannose Extract Bucket 1 | 37 | 4 | — | — | — |
| Mannose Extract Bucket 2 | 34 | 3 | — | — | — |
| Mannose Extract Bucket 3 | 31 | 3 | — | — | — |
| Mannose Extract Bucket 4 | 30 | 3 | — | — | — |
| Mannose Extract Bucket 5 | 36 | 3 | — | — | — |
| Mannose Extract Pool | 34[4] | 3[4] | 6.07 | 38 | 72 |

[1]Calculated by multiplying % Nitrogen by 6.25
[2]Mannan extract was extracted from this batch
[3]Mannan extract was spray dried onto this batch
[4]Average of the 5 bucket values

EXAMPLE 2

The following process was used to make mannan enriched cell wall and pure mannan from *Saccharomyces cerevisiae*. Briefly, the process involved performing autolysis on Mindak yeast, washing the obtained cell wall, extracting the cell wall with base, separating the extracted mannan from the remaining insoluble cell wall, acidifying the extract, centrifuging, and diafiltering the supernatant to obtain the final desired mannan extract. A portion of the extract was spray dried with un-extracted cell wall and a portion was spray dried in pure form.

Autolysis Procedure

The yeast autolysis was performed in 7 separate batches, each containing approximately 40 gallons of the starting yeast slurry at ~20% solids and ~6 kg of sodium chloride. Each batch was heated overnight at 50° C. in a 45 gallon stainless steel kettle with overhead mechanical stirring. The temperature was maintained with 3 Briskheat heating elements (model DHCS15-G) wrapped around the outside of the kettle. Each entire cook was washed in batch mode by filling 750 mL centrifuge bottles with the slurry and spinning for 30 minutes at 3,250 RPM in a centrifuge equipped with a 13 cm swinging bucket rotor. The centrifugation was performed while the reaction mixture was still warm. Following centrifugation, the supernatant was discarded and approximately 500 mL of DI water was added to each bottle. The pellet was mixed with a hand held electric mixer and the sides and bottom of the bottle were scraped with a spatula in order to obtain a homogeneous suspension that was then centrifuged as described above. The pellet was brought up in a minimum amount of water and transferred to 7 gallon pails. To prevent contamination, the pH of the solution was raised to a pH of 12 with NaOH (50% aqueous solution, 19.4 M). Each of the 7 batches of cell wall from the autolysis was kept separate. The 6th batch was inadvertently heated to 95° C. overnight but the cell wall from this batch was still used in the mannan extraction step. The 7th batch of cell wall was made from yeast that had been intentionally stored at 4° C. for 20 days and this batch also received an extra wash step following autolysis. Batches 1 through 6 were subjected to autolysis within 5 days of receipt of the Mindak yeast.

Mannan Extraction

The majority oldie cell wall, with the exception of the 7th batch, was carried through the mannan extraction by performing 6 separate base cooks. Each was brought back to the original ~40 gallon volume by adding Dl water and placed into the reaction kettle described above. The concentration of base was brought to 0.5 M (including the volume of NaOH added to get the initial pH to 12). Each cook was heated between 50° C. and 70° C. for 3 hours, The reaction was centrifuged as described above with the exception that the supernatant was the desired fraction and was saved. The centrifugation was performed while the reaction mixture was still warm. The supernatant from each bottle was pooled by pouring into a clean bucket. The pellets were discarded after this wash step.

Acidification Procedure

The quenching procedure was performed by adding, with stirring, concentrated sulfuric acid to the extract solution in 7 gallon pails to lower the pH to a value between 2 and 3. This suspension was centrifuged as described above. The supernatant from each bottle was pooled by pouring into clean buckets and eventually 55 gallon barrels and was stored at room temperature until diafiltration. A total of ~110 gallons of mannan extract was obtained from the 6 separate batches of cell wall.

Disfiltration

The dilute mannan extract was pumped into the nanofiltration (NP) feed tank using a positive displacement pump. The NF process was completed using an 8" diameter, 10K molecular weight cut-off nanofiltration filter manufactured by Parker. The initial volume of mannan extract was spilt into two roughly equal allotments to obtain concentrated mannose. The first allotment of ~55 gallons was concentrated down to approximately ½ the original volume before the addition of deionized diafiltration water to wash out salts and other small molecular weight impurities. The permeate was discarded and the concentrate was retained and recovered. A total of about 125 gallons of diafiltration water was used to wash the dissolved solids (4× of the concentrated volume). After the addition of the diafiltration water, the solution was further concentrated to ~14.5% dissolved solids as measured in brix by a refractometer. The concentrated solution was pumped out of the NF system and collected for spray drying. A minimal amount of additional water was used to wash the concentrated product out of the membrane system. This brought the final dissolved solids concentration of the collected product to about 13% dissolved solids. It was estimated that about 7.6 kg of mannan extract dissolved solids was in solution of 59 kg. (7.6/59=12.9% dissolved solids) The nanofiltration diafiltration process was repeated on the second allotment resulting in 50 kg of concentrated mannan extract at 15% dissolved solids.

FIG. 1 shows a GPC curve of the retentates after each diafiltration step. As shown, with each subsequent diafiltration step, mannose is more concentrated.

This is one example of concentrating the soluble MOS. Other methods, such as centrifugation, may also be used.

Spray Drying

The first allotment of concentrated mannan extract was spray dried an APV Anhydo Spray Dryer. The primary operating conditions for the spray dryer included an inlet air temperature of 180° C., an outlet air temperature of 95° C., a spinning disc atomizer speed of 2,750 rpm, exhaust fan speed of 88.5%, and liquid feed rates of 160-200 ml/min. The first allotment was dried until about 4.6 kg of total dried powder was collected. About 42 kg of solution was dried.

The remaining 17 kg of concentrated mannan extract was held over and added to the second allotment along with the 6 kg solution of up-extracted cell wall. The combined solution was heated in a Univat to 75° C. to pasteurize the solution and then spray dried under the same operating conditions with the exception that the liquid feed rate was slightly higher due to the higher overall dissolved solids content. A total of about 13.5 kg of dried mannan enhanced yeast cell wall was produced.

Analysis of the Final Powder

Samples of the final spray dried products were tested for mannose and glucose content (Table 2). The mannan-enriched cell wall product contained 39% mannose, 13% glucose and 64.7% total MOS, while the pure mannan product contained 49% mannose, 1.6% glucose and 86.2% total MOS. The starting cell wall that was eventually spray dried with mannan contained 24% mannose and 26% glucose.

In summary, approximately 180 kg of yeast was carried through autolysis and extraction to obtain approximately 12 kg of extracted mannan. A ~5 kg portion of the final mannan extract was spray dried alone and contained 49% mannose. Approximately 30 kg of yeast were carried only through autolysis to provide ~6 kg of un-extracted cell wall. The tin-extracted cell wall contained 24% insoluble mannose. A ~9 kg portion of the extracted mannose was spray dried with ~6 kg of the un-extracted cell wall and the final material confined 39% mannose.

TABLE 2

Analytical results for the final spray dried materials and starting cell wall.

| Sample | Mannose (%) | Glucose (%) | Nitrogen (%) | Protein (%)[1] | Ash (%) | Fat (%) | β-Glucan (%) | Total MOS (%) |
|---|---|---|---|---|---|---|---|---|
| Ex. 2 Mannan Enriched Cell Wall | 39 | 13 | 4.1 | 25.7 | 2.7 | 3.3 | 17.2 | 64.7 |
| Ex. 2 Mannan Extract | 49 | 1.6 | 6.0 | 37.2 | <0.04 | 0.8 | 4.2 | 86.2 |
| Cell Wall | 24 | 26 | — | — | — | — | — | — |

[1]Calculated by multiplying % Nitrogen by 6.25

REFERENCES

1. Lipke, P and R. Ovalle, 1998, Cell Wall Architecture in Yeast: New Structure and New Challenges, J. Bacteriol. 180:3735-3740.
2. Orlean, P. 1997. Biogenesis of yeast wall and surface components, p. 229-362. in J. Pringle, J. Broach, and E, Jones (ed.), Molecular and cellular biology of the yeast *Saccharomyces*, Vol. 3. Cell cycle and cell biology. Cold Spring Harbor Laboratory Press, Cold Spring Harbor, N.Y.
3. Van der Vaart, J. M., L. H. P. Caro, J. W. Chapman, F. M. Klis, and C. T. Verrips. 1995. Identification of three mannoproteins in the cell wall of *Saccharomyces cerevisiae*. J. Bacteriol. 177:3104-3110.
4. http://en.wikipedia.org/wiki/Mannan_Oligosaccharide_based_nutritional_supplement_(M OS)
5. Hooge, Danny M. (2004). "Meta-analysis of Broiler Chicken Pen Trials Evaluating Dietary Mannan Oligosaccharide, 1993-2003", *International Journal of Poultry Science* 3: 163-74.
6. Newman, K. Jacques, K. A.; Buede, R. (1993). "Effect of mannanoligosaccharide on performance of calves fed acidified and non-acidified milk replacers". *J. Anim. Sci.* 71 (Suppl. 1): 271.
7. Rosen, G. D. (2007). "Holo-analysis of the efficacy of Bio-Mos® in pig nutrition", *Animal Science* 82: 683-9.
8. Torrecillas, S; Makol, A; Caballero, M; Montero, D; Robaina, L; Real, F; Sweetman, J; Tort, L et al. (2007). "Immune stimulation and improved infection resistance in European sea bass (*Dicentrarchus labrax*) fed mannan oligosaccharides". *Fish & Shellfish Immunology* 23: 969-81.

The complete disclosure of all patents, patent applications, and publications, and electronically available material (including, for instance, nucleotide sequence submissions in, e.g., GenBank and RefSeq, and amino acid sequence submissions in, e.g., SwissProt, PIR, PRF, PDB, and translations from annotated coding regions in GenBank and RefSeq) cited herein are incorporated by reference in their entirety. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified.

The invention claimed is:

1. A non-enzymatic process for making a composition of about 62% to about 90% soluble mannan-oligosaccharide comprising:
  i) extracting yeast cell walls with base;
  ii) separating the soluble mannan-oligosaccharide solution of step i) from insoluble material;
  iii) quenching the soluble mannan-oligosaccharide solution of step ii) with acid at room temperature; and
  iv) concentrating the soluble mannan-oligosaccharide solution of step iii).

2. The process of claim 1 and further comprising:
  spray-drying the soluble mannan-oligosaccharide solution of step iv).

3. The process of claim 1 and further comprising:
  adding yeast cell wall solution to the soluble mannan-oligosaccharide solution of step iv).

4. The process of claim 3 and further comprising:
  spray-drying the yeast cell wall and soluble mannan-oligosaccharide solution.

5. The process of claim 1 wherein the soluble mannan-oligosaccharide solution is concentrated by diafiltration or centrifugation.

6. The process of claim 1 wherein the quenching step iii) comprises bringing the soluble mannan-oligosaccharide solution to a pH between about 2 and 4.5.

7. The process of claims 3 and further comprising:
  pasteurizing the yeast cell wall solution and the soluble mannan-oligosaccharide solution.

8. The process of claim 1 wherein the base of step i) is at a final concentration of 0.5 M.

9. The process of claim 1 wherein the yeast cells walls are from *Saccharomyces cerevisiae*.

10. A non-enzymatic process for making soluble mannan-oligosaccharide-enriched animal feed, the method comprising:
  i) washing yeast cell walls with water;
  ii) extracting yeast cell walls with base;
  iii) separating soluble mannan-oligosaccharide solution of step ii) from insoluble material;
  iv) quenching the soluble mannan-oligosaccharide solution of step iii) with acid at room temperature;
  v) concentrating the soluble mannan-oligosaccharide solution of step iv);
  vi) spray-drying the soluble mannan-oligosaccharide solution of step v) to a composition of about 62% to about 90% soluble mannan-oligosaccharide; and
  vii) combining the soluble mannan-oligosaccharide powder of step vi) with animal feed.

11. The process of claim 10 wherein the soluble mannan-oligosaccharide powder is combined with the animal feed to a final concentration of 0.5 kg/metric ton to 3.2 kg/metric ton.

12. The process of claim 10 and further comprising:
  adding yeast cell wall solution to the soluble mannan-oligosaccharide solution of step v).

13. The process of claim 10 wherein the extraction of step ii) is carried out at 50° C.

* * * * *